United States Patent [19]
Earl

[11] 3,916,777
[45] Nov. 4, 1975

[54] MEAT TENDERIZING SYSTEM

[75] Inventor: Roscoe T. Earl, Lincolnshire, Ill.

[73] Assignee: Baxter Laboratories, Inc., Morton Grove, Ill.

[22] Filed: Aug. 15, 1973

[21] Appl. No.: 388,461

[52] U.S. Cl. .................................... 99/533; 17/24
[51] Int. Cl.[2] ........................................ A23C 4/14
[58] Field of Search .............. 99/532, 533; 198/177; 17/24

[56] References Cited
UNITED STATES PATENTS

| | | | |
|---|---|---|---|
| 2,110,263 | 3/1938 | Dziedzic | 99/532 X |
| 2,915,958 | 12/1959 | Rice | 99/532 X |
| 3,077,997 | 2/1963 | Toennies | 17/24 X |
| 3,088,418 | 5/1963 | Armitage et al. | 198/177 R X |
| 3,149,555 | 9/1964 | Baum et al. | 99/532 X |
| 3,221,866 | 12/1965 | Nash | 198/177 R |
| 3,507,207 | 4/1970 | Rogers et al. | 99/532 |
| 3,718,083 | 2/1973 | Walters | 99/532 |
| 3,734,001 | 5/1973 | Poster | 99/532 |
| 3,774,265 | 11/1973 | Anderson et al. | 198/177 R X |

Primary Examiner—Peter Feldman
Assistant Examiner—Arthur O. Henderson
Attorney, Agent, or Firm—George H. Gerstman; W. Garrettson Ellis; L. Altman

[57] ABSTRACT

An improved meat tenderizing system is provided in which hoses are individually, manually controlled to feed selected, metered amounts of an enzyme injection solution to injection needles. The injection solution is distributed to a number of hoses through a manifold and a manually operable flow meter is coupled to each hose upstream of the injection needles and downstream of the manifold.

8 Claims, 4 Drawing Figures

MEAT TENDERIZING SYSTEM

The aforementioned Abstract is neither intended to define the invention of the application which, of course, is measured by the claims, nor is it intended to be limiting as to the scope of the invention in any way.

BACKGROUND OF THE INVENTION

This invention relates to an improved system for tenderizing meat by injecting an enzyme solution immediately after slaughter.

Prior art beef tenderizing techniques include the injection of an enzyme solution into the beef immediately after slaughter while the carcass is still within the body temperature range. The quantity of the enzyme solution injection must be equal to a selected percentage of the weight of the meat unit. If too much enzyme solution is used, the meat may have excess moisture or may be too tender. On the other hand, if too little solution is used, the tenderization may be ineffective. Further, federal regulations presently prohibit injection of more enzyme solution than 2.6 percent of the weight of the carcass.

A prior art meat tenderizing apparatus of the enzyme injection type is disclosed in the patent to Roscoe T. Earl and Glen E. Wehl, U.S. Pat. No. 3,232,209, issued Feb. 1, 1966. In this patent, apparatus is disclosed for distributing an enzyme injection solution to a number of parallelly connected hoses, each of which is coupled to a plurality of injection needles. All of the hoses communicate with a manifold which is coupled to an enzyme injection solution storage tank via appropriate conduit. In the Earl and Wehl patent, even and simultaneous distribution of the injection solution is provided by using an electrically controlled flow meter upstream of the manifold. One of the difficulties of such a system, however, is that the enzyme solution flow in each set of injection needles is dependent upon the flow in the other sets of injection needles. Since the flow meter permits an overall amount of solution to flow to the manifold, the set of injection needles being under the least amount of pressure will receive the greatest flow, while the set of injection needles under the highest pressure will receive the least amount of solution flow. Further, all of the sets of injection needles must be inserted into the meat unit or else the solution will be dumped through the unoperated set of injection needles while the inserted sets will receive a minimum amount of solution. In addition, the flow meter disclosed in the Earl and Wehl patent requires relatively complex electrical equipment for proper operation thereof.

Another prior art system includes a number of injection headers which simultaneously receive separately measured amounts of injecting solution. An example of this system is disclosed in the patents to Mitchell W. Panek, U.S. Pat. Nos. 3,556,808 and 3,636,857. Simultaneous injections may be detrimental, however, because the operators do not have the flexibility to inject at will and such simultaneous injection may be deleterious to rapid production.

I have developed an improved system for tenderizing meat which may permit 300–600 sides of beef per hour or 150–300 beef carcasses per hour to be handled. This is in contrast to a maximum of about 80 sides of beef which can be handled by prior art apparatus. My improved system permits each operator to have individual control over his set of injection needles, thereby enabling a metered amount of enzyme solution to be injected, at the operator's own will, into the portion of the meat under the control of the particular operator. In this manner, each injection header can be set by the operator to feed a selected amount of injection solution that is different from the amounts fed by other headers. Further, each operator can decide when to trigger his particular injection header.

I have further discovered that production using my new system can be improved by utilizing a unique conveying system which segregates left and right sides of beef and permits a rapid production rate. It is to be understood, however, that although the illustrative embodiment of the invention relates to the tenderization of sides of beef, the invention is applicable to tenderization of other meats, such as lamb, veal, pork and mutton.

It is, therefore, an object of the present invention to provide an improved meat tenderizing system in which the injection solution flow is individually controlled through each set of injection needles.

A further object of the present invention is to provide a meat tenderizing system which operates on a production line basis to achieve a very high production rate.

A still further object of the present invention is to provide an efficient, high production meat tenderizing system which alleviates many of the disadvantages concomitant with prior art meat tenderizing techniques.

Still other advantages and objects of the present invention will be apparent as the description proceeds.

BRIEF DESCRIPTION OF THE INVENTION

In accordance with the present invention, there is provided a system for tenderizing meat in which an enzyme injection solution is mixed and fed to a plurality of injection needles through a manifold which distributes the solution to a plurality of flexible hoses, with each of the hoses being coupled to a header having the plurality of injection needles communicating therewith. The improvement comprises manually operable means for regulating flow to each header individually. The manually operable means comprises a flow meter coupled to each hose upstream of the header and downstream of the manifold. The manually operable means further comprises means for triggering each of the flow meters to open the flow line. In this manner, a selected, metered amount of enzyme injection solution is permitted to flow to the respective header for each triggered operation.

In the illustrative embodiment, the flow meter is in a pistol form and is calibrated in weight units. In this manner, the operator can select the metered amount of enzyme injection solution to correspond to a selected percentage of the weight of the meat unit.

In the illustrative embodiment, means are provided for conveying carcass sides to tenderizing stations. The conveying means comprises means for separating left sides from right sides and for transporting left sides to a left side tenderizing station and for transporting right sides to a right side tenderizing station. The flow meters and injection needles are located at the tenderizing stations to thereby permit an operator at a right side tenderizing station to inject right sides and a different operator at a left side tenderizing station to inject left sides, with each operator having individual control over the enzyme injection.

A more detailed explanation of the invention is provided in the following description and claims, and is illustrated in the accompanying drawings.

DETAILED DESCRIPTION OF THE ILLUSTRATIVE EMBODIMENT

Figure 1:
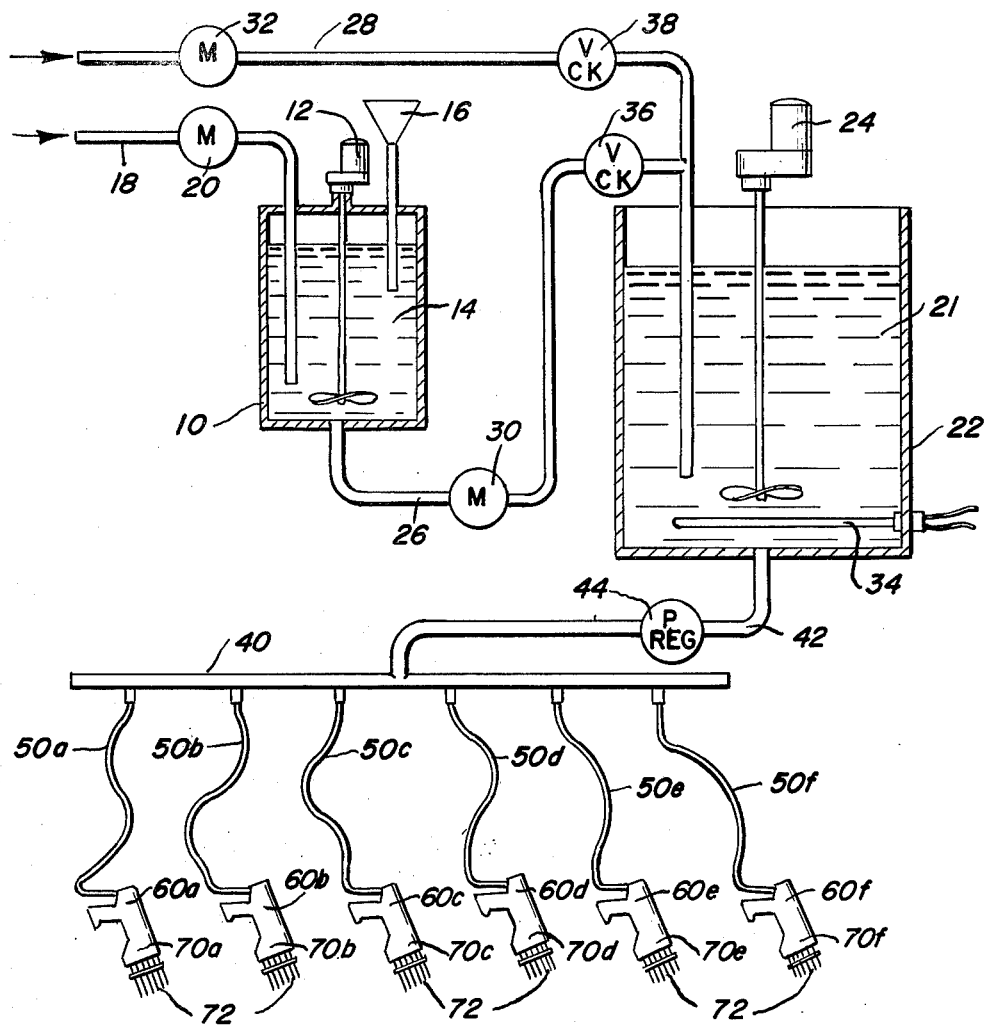
FIG. 1 is a schematic flow diagram of a meat tenderizing system in accordance with the principles of the present invention.

Referring to FIG. 1, there is shown therein a pressurized tank 10 having an associated mixer 12, which tank is used to mix and store enzyme concentrate 14 therein. The enzyme liquid or powder 14 is added to mixing tank 10 via inlet 16, and cold water is added to the tank via conduit 18 with the amount of water being regulated by an electric water meter 20. Meter 20 is of a type which provides a metered amount of fluid in response to each actuation thereof.

After the enzyme liquid or powder is added via inlet 16, the tank 10 is closed and the operator sets the dial on meter 20 to the correct amount of cold water to be added. As the water is being added, the low speed mixer 12 is operated to mix the solution, and when the tank is filled to the proper level, the mixer 12 will continue to operate.

In the illustrative embodiment, a proteolytic enzyme is used. The enzyme preferred for use in the present invention is papain, which is derived from the tropical papaya plant. A description of a satisfactory proteolytic enzyme solution is found in the patent to Silberstein, U.S. Pat. No. 3,276,879, assigned to the assignee of the present invention.

The injection solution 21 is made up in injection solution tank 22 havving a variable speed mixer 24 associated therewith. A metered amount of enzyme concentrate is fed to tank 22 via conduit 26 and a metered amount of hot water is also fed to the tank 22 via conduit 28. Conduit 26 utilizes a one-pint meter 30 while conduit 28 utilizes a one-gallon meter 32, whereby conduit 28 will generally provide eight times more liquid than the liquid provided by conduit 26.

The water fed to injection solution tank 22 is preheated to approximately 100°F and the injection solution 21 within tank 22 is maintained at approximately 100°F by means of heater 34. The enzyme injection solution is injected into the meat unit immediately after slaughter while the carcass is still within the body temperature range and the enzyme injection solution should be at approximately the same temperature during injection.

When the operator is ready to fill the injection solution tank 22, he sets the fill dial to the proper setting and pushes a start button which simultaneously opens solenoid check valve 36 on line 26 and solenoid check valve 38 on line 28. Meter 32 may be any conventional meter operative to provide the necessary signal to close solenoid check valves 36 and 38 when the metered amount of liquid has passed.

After the injection tank is filled to the proper level, solenoid check valves 36 and 38 will close, simultaneously stopping flow into tank 22. During the filling of tank 22, variable speed mixer 24 should be at a high speed. After the tank is filled, the speed of mixer 24 is reduced and the temperature of the injection solution within tank 22 is maintained at approximately 100°F.

The pressure in the concentrate tank 10 should be slightly higher (approximately 30 psi to 50 psi) than the pressure maintained in the injection solution tank 22 (approximately 20 psi to 30 psi). Injection solution tank 22 has a preset air release valve to allow venting while the tank 22 is being filled. Filling of injection solution tank 22 can be accomplished while the injection procedure is operated.

The injection solution is fed to a distribution manifold 40 via conduit 42. Conduit 42 has an in-line pressure regulator control valve 44 so that the liquid pressure in line 42 can be maintained between 10 psi and 20 psi.

Manifold 40 distributes to a number of flexible hoses 50a, 50b, 50c, 50d, 50e, etc., which are connected in parallel as shown in FIG. 1. Hoses 50a – 50e feed the injection solution through manually operable flow meters 60a, 60b, 60c, 60d, 60e, etc. to headers 70a, 70b, 70c, 70d, 70e, etc., each of which has a number of injection needles 72 extending therefrom and communicating therewith. Although the number of injection needles may vary, six needles 72 per header 70 are preferred.

The injection solution is drawn from storage tank 22 when the operator jams the injection needles into the side or squeezes the trigger 73 associated with flow meter 60. Each of the lines 50 is individually controlled so that if an operator is triggering flow meter 60a while other operators are not triggering the other flow meters, there will only be flow in line 50a to header 70a for the injection. Additionally, the individual control permits different metering for each line. For example, the operator may set flow meter 60a to a particular setting while flow meter 60b is set to a different metering amount. Although flow meters 60a and 60b may be actuated at the same time by separate operators, different metered amounts of injection solution will be provided to headers 70a and 70b under such circumstances. This is particularly desirable, for example, where different portions of sides of beef require different amounts of injected enzyme solution, or where the separate operators are injecting different sides of beef which would be of different weights requiring different amounts of enzyme solution.

Figure 2:
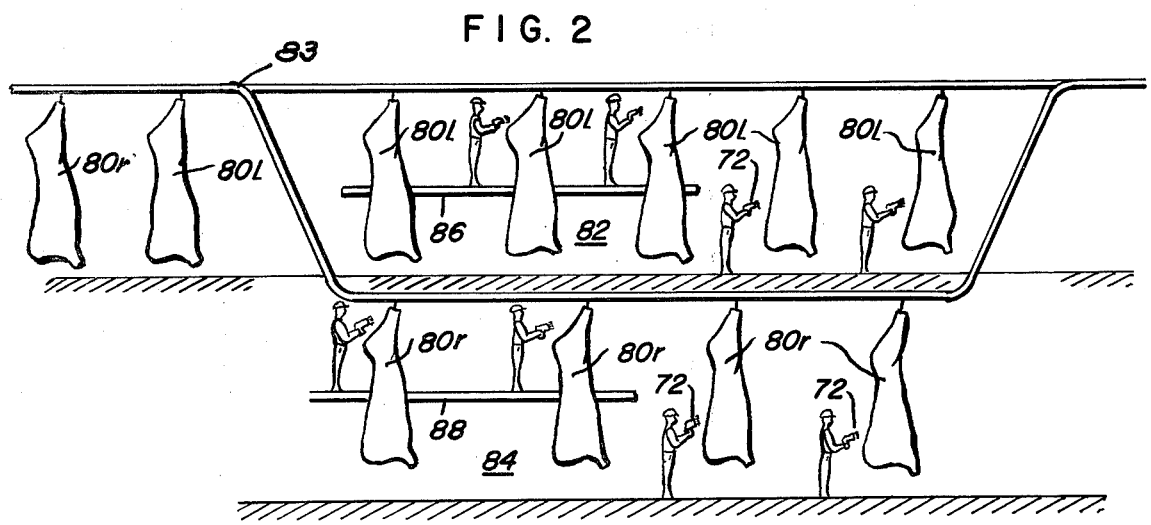
FIG. 2 is a front view, in diagrammatic form, of meat tenderizing stations in accordance with the principles of the present invention.

In FIG. 2, there is shown sides of beef 80 being conveyed to tenderizing stations 82 and 84. For purposes of designation, right sides of beef are designated 80R and left sides of beef are designated 80L. At point 83 in the conveying system, rights sides 80R are separated from left sides 80L so that the left sides of beef are conveyed to meat tenderizing station 82 while the right sides of beef are conveyed to meat tenderizing station 84.

Tenderizing station 82 has a raised platform 86 and tenderizing station 84 has a raised platform 88. The raised platforms 86 and 88 enable operators to inject the upper portion of the sides of beef while the lower portions can be injected by operators standing on the floor.

The sides of beef are moved into tenderizing stations immediately after slaughter and washing and while the sides of beef are still approximately body temperature of the animal. The number of injections to be made by each operator will depend upon the speed of the line. For example, if a line is moving at 200 sides per hour, the operator may make a total of four injections with each header 70. If the line is moving at 250 sides per hour, the operator may make three injections, and at 300 sides per hour, only two injections. The total number of operators on the line depends upon the line speed and it is preferred that each side of beef receive between 18 and 20 injections depending on the size or quality.

Prior to injection, the side of beef or carcass is weighed. A weight tag is placed on each side or carcass in a selected area so as to be prominently visible to the operator. The operator can then select a meter setting that is appropriate relative to the weight of the side of carcass so that the amount of total enzyme injected will not be more than 2.6 percent of the total weight of the side or carcass (which will be equivalent to no more than 3 percent of the boneless meat). After injection of the enzyme solution, the side or carcass is then shrouded in the usual manner and moved into the beef chilling room for proper refrigeration.

Figures 3, 4:
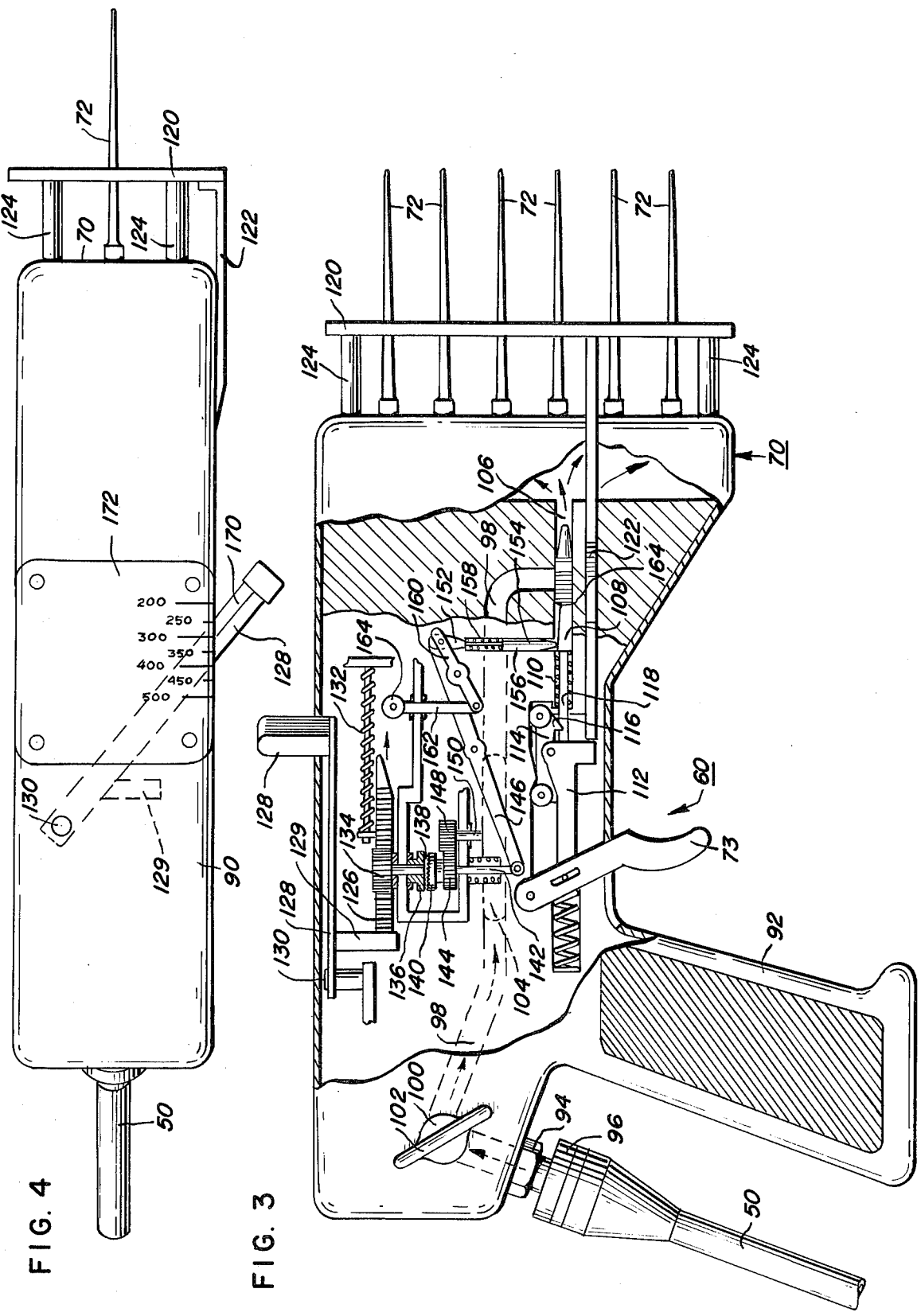
FIG. 3 is a front view, substantially broken for clarity of operation, of a manually operable flow meter, associated header and needles constructed in accordance with the principles of the present invention.
FIG. 4 is a fragmentary top view of the flow meter of FIG. 3.

In FIG. 3, there is shown one of the flow meters 60 which is pistol-shaped and has at its outlet end a header 70 with which needles 72 communicate. FIG. 4 shows the meter settings, which are calibrated in units corresponding to the weight of the side of beef or carcass.

Referring to FIGS. 3 and 4, flow meter 60 comprises a housing 90 having a handle portion 92 for gripping by the operator. A hose 50 is coupled to housing 90 at inlet 94, by suitable coupling means 96. The flow meter 60 defines a liquid flow path 98, having interpopsed therewithin a pressure compensating valve 100 having an adjusting tab 102 which can be turned by the operator to adjust the flow pressure in channel 98. Also interposed in channel 98 is a paddle wheel vane 104, which wheel is turned by the fluid flow, as will be discussed below. Channel 98 is coupled to an orifice 106 which communicates with the inside of header 70. As stated above, needles 72 also communicate with the inside of header 70 so that header 70 effectively distributes liquid to the injection needles 72 when the header receives liquid from orifice 106.

Orifice 106 is normally blocked from receiving liquid from channel 98 by valve stem 108, which is biased to the right (with respect to FIG. 3) by valve return spring 110. Valve stem 108 is coupled to trigger 73 through link 112 and clutch 114, which clutch has a tooth 116 that engages a groove in the rod 118 fastened to the rear of valve stem 108. A buffer plate 120 is coupled to the housing 90 by a push rod 122 and by arms 124 which are slidable within header 70. When needles 72 are inserted into a meat unit, buffer plate 120 will be pushed in the leftward direction (with respect to FIG. 3) thereby moving push rod 122 leftward to have the same effect as if trigger 73 were pulled by the operator.

Metering of the fluid flow is achieved by means of a trip rack 126 which can be set by adjusting lever 128. Lever 128 is pivoted via pivot 130 and carries a stop member 129. When lever 128 is pulled backward, trip rack 126 moves to the left (with respect to FIG. 3) under the bias of return spring 132, until the trip rack 126 abuts stop member 129. A gear 134 engages the teeth on trip rack 126 to move the trip rack to the right (with respect to FIG. 3). Gear 134 is connected to one side 136 of a toothed clutch 138. The other side 140 of toothed clutch 138 is connected to rod 142 which is journalled within intermediate gear 144 and is pivotally connected to link 146. Intermediate gear 144 engages two other intermediate gears (not shown) which form a gear train that engages driven gear 148. Gear 148 is coupled to the paddle wheel vane 104 through an input shaft 150. The gear train mentioned above places rod 142 out of the path of paddle wheel 104. Link 146 is coupled to rod 152, which rod is fastened to a detent 154. Rod 152 and detent 154 slide within chamber 156 and detent 154 is biased downwardly via spring 158 that is located within chamber 156.

In addition to rod 152 being pivotally coupled to link 146, the rod 152 is also pivotally coupled to a link 160, which link 160 is coupled through arm 162 to a roller shoe 164.

The operation of the flow meter 60 is as follows. When the needles 72 are inserted into a meat unit, push rod 122 will move leftwardly (with respect to FIG. 3) to force arm 112 to the left, thereby forcing tooth 116 to move rod 118 to the left. The same movement of rod 118 would occur if the operator would pull trigger 73. Movement of rod 118 to the left will move valve stem 108 leftwardly until detent 154 enters groove 164 defined by valve stem 108. When detent 154 enters groove 164, channel 98 will be in communication with orifice 106 and there will be fluid flow into header 70 and the fluid will be distributed to needles 72.

When detent 154 enters groove 164, link 146 will pivot clockwise to raise arm 142 thereby engaging clutch 138 so that toothed side 140 of clutch 138 engages toothed side 136 thereof. As the fluid flows in channel 98, paddle wheel 104 will turn, thereby causing driving gear 148 to turn the intermediate gears (which are not shown). The gear train turns intermediate gear 144, causing side 140 to rotate and further causing rotation of side 136 and of gear 134. Rotation of gear 134 will cause the trip rack 136 to move to the right (with respect to FIG. 3) and it will continue to move to the right until it engages roller shoe 164. Engagement of roller shoe 164 will cam the roller shoe downwardly to pivot link 160 in the counterclockwise direction thereby raising rod 152 to remove detent 154 from groove 164. Upon such removal of detent 154 from groove 164, valve stem 108 will return under the action of valve return spring 110 to its position shown in FIG. 3 and fluid flow into orifice 106 will cease.

It can be seen that the amount of fluid flow is determined by the position of trip rack 126. The position of trip rack 126 is determined by adjusting lever 128 manually. Lever 128 carries stop member 129 and thus determines how far to the left the trip rack 126 can move under the leftward bias of spring 132.

FIG. 4 shows a calibrated legend plate 122 with the numbers thereon corresponding to the weight in pounds of the meat unit. Lever 128 has a line 170 inscribed thereon to align with the reference line, on the legend plate 172, which corresponds to the weight of the meat unit. It is to be understood that a circular dial type of gauge could be used effectively, although a linear gauge is illustrated.

The operator prepares for injecting the side and/or carcass by first observing the weight tag affixed to each side or carcass and then setting the lever 128 on the flow meter 60 to the proper weight setting. The operator then inserts the needles 72 into the meat unit in the desired area and the flow of enzyme solution is activated by movement of buffer plate 120. As soon as the present amount of enzyme solution passes through the meter into the meat unit, the flow meter will shut off in the manner described above, thereby stopping the flow, and will reset ready for the next injection or to be activated by squeezing the trigger. The operator may make as many injections into the same side or carcass as required without changing the setting.

In a specific example, 250 sides of beef per hour, with each of the sides being 300 pounds, are tenderized. Headers with six injection needles 72 per header 70 are used and three injections are made, for a total of 18 needle entries. The gauge is set on the meter to 300 so that each needle will feed 5⅓ ounces of injection solution. It can be seen that 18 needle entries will result in injection of six pounds of solution, which is equal to 2 percent of the weight of the side of beef being injected. For different production rates, different legend plates 172 are substituted. If desired, the same legend plate can be used if it is moved in relation with the piston of the lever, to vary in accordance with any variation in the production rate.

By using the aforementioned meat tenderization system, a very high production rate of meat tenderization is possible. Although an illustrative embodiment of the invention has been shown and described, it is to be understood that various modifications and substitutions may be made by those skilled in the art without departing from the novel spirit and scope of the present invention.

That which is claimed is:

1. In a system for tenderizing meat in which an injection solution is mixed and fed to a plurality of injection needles through a manifold which distributes the solution to a plurality of flexible hoses, with each of said hoses coupled to a manually operable device including a header having said plurality of injection needles communicating therewith; the improvement comprising manually operable means carried by said device for regulating flow to each header individually, said manually operable means comprising a manually adjustable flow meter coupled to each hose upstream of said header and downstream of said manifold; and means for triggering each of said flow meters to open the flow line thereby permitting a selected, metered amount of injection solution to flow to the respective header for each triggering operation, said flow meter being located adjacent said header to permit the operator triggering said flow meter to adjust said flow meter for each different meat item prior to triggering 2. A system as described in claim 1, in which said flow meter is calibrated in weight units whereby the operator can select the metered amount of injection solution to correspond to a selected percentage of weight of the meat unit.

3. A system as described in claim 1, and valve means for selectively regulating flow line pressure, and said valve means being connected upstream of said manifold.

4. A system, as described in claim 1, wherein each said flow meter, header and associated injection needles are combined in the form of a hand-held pistol-shaped unit.

5. A system as described in claim 1, including means for separating left carcass sides from right carcass sides; conveying means for transporting left carcass sides to a left side tendering station; and conveying means for transporting right carcass sides to a right side tenderizing station; said hoses and injection needles being located at said tenderizing stations to thereby permit an operator at a right side tenderizing station to inject right sides and a different operator at a left side tenderizing station to inject left sides, with each operator having individual control over the injection.

6. A system for tenderizing meat, which comprises: means for mixing and storing an injection solution; a distribution manifold; conduit coupling said mixing and storing means to said manifold; a plurality of hoses communicating with said manifold; each of said hoses having its own manually operable flow meter associated therewith to provide individual control of flow in each hose; each of said flow meters being calibrated so that the operator can select a metered amount of injection solution to correspond to a selected percentage of the weight of meat unit; each of said flow meters being operable to meter a selected amount of injection solution therethrough; a header coupled to each of said hoses downstream of and adjacent the respective hose's flow meter; and a plurality of injection needles extending from and connumicating with each said header.

7. A system as described in claim 6, wherein each said flow meter, header and associated injection needles are combined in the form of hand-held pistol-shaped unit.

8. A system as described in claim 6, including means for separating left carcass sides from right carcass sides; conveying means for transporting left carcass sides to left side tenderizing station; and conveying means for transporting right carcass sides to a right side tenderizing station; said hoses and injection needles being located at said tenderizing stations to inject right sides and a different operator at a left side tenderizing station to inject left sides, with each operator having individual control over the injection.

* * * * *